US011175800B2

(12) United States Patent
Nasson et al.

(10) Patent No.: US 11,175,800 B2
(45) Date of Patent: *Nov. 16, 2021

(54) ELEMENT MAPPING AND RULE BUILDING SYSTEMS AND METHODS FOR CONTEXTUAL SITE VISITOR ENGAGEMENT

(71) Applicant: Moxie Software, Inc., Austin, TX (US)

(72) Inventors: Randy Nasson, San Francisco, CA (US); Michael Galloway, San Jose, CA (US); Prescott Wright, Bozeman, MT (US); Jonathan Pollock, Berkley, MA (US); Shane E. Sherman, Austin, TX (US); Jonathan Lee Bell, Austin, TX (US)

(73) Assignee: MOXIE SOFTWARE, INC., Austin, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/533,887

(22) Filed: Aug. 7, 2019

(65) Prior Publication Data
US 2020/0081593 A1 Mar. 12, 2020

Related U.S. Application Data

(63) Continuation of application No. 14/964,008, filed on Dec. 9, 2015, now Pat. No. 10,425,501.
(Continued)

(51) Int. Cl.
*G06F 3/0483* (2013.01)
*G06F 3/0486* (2013.01)
*H04L 29/08* (2006.01)

(52) U.S. Cl.
CPC .......... *G06F 3/0483* (2013.01); *G06F 3/0486* (2013.01); *H04L 67/025* (2013.01)

(58) Field of Classification Search
CPC .... G06F 3/0483; G06F 16/958; G06F 3/0486; G06F 3/0482
See application file for complete search history.

(56) References Cited

U.S. PATENT DOCUMENTS 6,751,659 B1  6/2004  Fenger
8,676,895 B1  3/2014  Roy et al.
(Continued)

OTHER PUBLICATIONS

International Search Report and Written Opinion for PCT Patent Application No. PCT/US2015/043820, dated Oct. 28, 2015, 10 pgs.
(Continued)

*Primary Examiner* — Tan H Tran
(74) *Attorney, Agent, or Firm* — Soroker Agmon Nordman

(57) ABSTRACT

A new element mapper is provided for mapping elements of a page using user-provided or automatically generated terms or names. Specifically, a user may direct an application displaying a page to enter into an in-context element mapping mode, in which page elements eligible for mapping may be identified and highlighted whenever one is moused or hovered over. Responsive to the user selecting a page element of interest, the element mapper may provide a dialog with an input field. The dialog may be displayed near the page element of interest or as part of the page. Based on a user-provided or automatically generated name, the element mapper may generate a mapping output and store it in association with a selector for the page element of interest. The mapping output can be used to build a site rule in context of the page element of interest.

20 Claims, 20 Drawing Sheets

Related U.S. Application Data

(60) Provisional application No. 62/089,680, filed on Dec. 9, 2014.

(56) References Cited

U.S. PATENT DOCUMENTS

| | | | |
|---|---|---|---|
| 8,682,977 | B1 | 3/2014 | Roy et al. |
| 8,825,734 | B2 | 9/2014 | Roy et al. |
| 10,425,501 | B2 | 9/2019 | Nasson |
| 10,587,672 | B2 | 3/2020 | Galloway et al. |
| 10,986,160 | B2 | 4/2021 | Galloway et al. |
| 2003/0069923 | A1 | 4/2003 | Peart |
| 2004/0019595 | A1 | 1/2004 | Bhogal et al. |
| 2004/0030421 | A1 | 2/2004 | Haley |
| 2005/0081144 | A1 | 4/2005 | Hailey et al. |
| 2007/0061412 | A1* | 3/2007 | Karidi ............... G06Q 30/02 709/217 |
| 2008/0046562 | A1 | 2/2008 | Butler |
| 2008/0059584 | A1* | 3/2008 | Lam ............... G06F 16/9562 709/205 |
| 2008/0082673 | A1* | 4/2008 | Dynin ............... G06F 16/9562 709/228 |
| 2008/0235194 | A1 | 9/2008 | Shima et al. |
| 2009/0006415 | A1 | 1/2009 | McAniff et al. |
| 2009/0171898 | A1 | 7/2009 | Prager et al. |
| 2010/0107056 | A1 | 4/2010 | Underhill et al. |
| 2010/0223378 | A1 | 9/2010 | Wei |
| 2011/0010244 | A1 | 1/2011 | Hatridge et al. |
| 2011/0208822 | A1 | 8/2011 | Rathod |
| 2011/0302098 | A1 | 12/2011 | Yoshida et al. |
| 2011/0314092 | A1 | 12/2011 | Lunt et al. |
| 2012/0215624 | A1 | 8/2012 | Ramer et al. |
| 2012/0221418 | A1 | 8/2012 | Smith |
| 2012/0246558 | A1 | 9/2012 | Brooks et al. |
| 2013/0054509 | A1 | 2/2013 | Kass et al. |
| 2013/0091419 | A1 | 4/2013 | Caliman et al. |
| 2013/0212497 | A1 | 8/2013 | Zelenko et al. |
| 2014/0012626 | A1 | 1/2014 | Ajmera et al. |
| 2014/0082525 | A1 | 3/2014 | Kass et al. |
| 2014/0089472 | A1 | 3/2014 | Tessler |
| 2014/0282121 | A1 | 9/2014 | Sun et al. |
| 2015/0106686 | A1* | 4/2015 | Blitzstein ............... G06F 16/958 715/234 |
| 2015/0200822 | A1 | 7/2015 | Zelenko |
| 2016/0044083 | A1 | 2/2016 | Galloway et al. |
| 2016/0070686 | A1 | 3/2016 | Yu et al. |
| 2016/0162140 | A1 | 6/2016 | Nasson et al. |
| 2016/0344838 | A1 | 11/2016 | Wistow et al. |
| 2020/0177666 | A1 | 6/2020 | Galloway et al. |

OTHER PUBLICATIONS

International Search Report and Written Opinion for PCT Patent Application No. PCT/US2015/064745, dated Feb. 12, 2016, 8 pgs.
Office Action for U.S. Appl. No. 14/206,432, dated Mar. 10, 2016, 11 pgs.
International Preliminary Report on Patentability for PCT Application No. PCT/US2015/043820, dated Feb. 16, 2017, 9 pgs.
International Preliminary Report on Patentability for PCT Application No. PCT/US2015/064745, dated Jun. 22, 2017, 7 pgs.
Office Action for U.S. Appl. No. 14/819,043, dated Sep. 19, 2017, 21 pgs.
Office Action for U.S. Appl. No. 14/964,008, dated Oct. 17, 2017, 18 pgs.
Office Action for U.S. Appl. No. 14/819,043, dated Feb. 15, 2018, 30 pgs.
Office Action for U.S. Appl. No. 14/964,008, dated May 22, 2018, 22 pgs.
Office Action for U.S. Appl. No. 14/819,043, dated Feb. 25, 2019, 32 pgs.
Notice of Allowance for U.S. Appl. No. 14/964,008, dated May 15, 2019, 7 pgs.
Office Action for U.S. Appl. No. 14/819,043, dated Jun. 18, 2018, 31 pgs.
Notice of Allowance for U.S. Appl. No. 14/819,043, dated Oct. 29, 2019, 7 pages.
Notice of Allowance issued for U.S. Appl. No. 16/782,494, dated Dec. 4, 2020, 21 pages.

* cited by examiner

AMY SMITH

- Dashboard
- Reporting
- Rules ∨
  - Manage Rules
  - Create Rule
  - Rule Settings
- Mapped Elements

Mapped Elements — 990

The Element Mapper is a browser bookmarklet that enables you to identify and map elements on your website which you can use in your rule criteria. Learn More

[Install Element Mapper]

| Name | Page Title | Page URL | Selector | Actions |
|---|---|---|---|---|
| Third Image | Canon Rebel XS 10.1MP Digital SLR Camera with EF-S 18-55mm - Cameras & Camcorders | http://192.168.152.140:8080/index.php/cameras-camcorders/canon-rebel-xs-10-1mp-digital-slr-camera-with-ef-s-18-55mm.html | #product_addtocart_form > div.product-img-box > div > div > ul > li:nth-child(3) > a > img | Edit Delete |
| Product Name ← 917 | Canon Rebel XS 10.1MP Digital SLR Camera with EF-S 18-55mm - Cameras & Camcorders | http://192.168.152.140:8080/index.php/cameras-camcorders/canon-rebel-xs-10-1mp-digital-slr-camera-with-ef-s-18-55mm.html | form#product_addtocart_form div.product-shop div.product-name h1  ↖ 995 | Edit Delete |

| Location | Criteria | Action | Settings |
|---|---|---|---|

Locations

[ Add Location ]

URL Contains "Bush Syndicate"

Edit | Delete

Page Element "Bush"(r) Syndicate 72" L-Desk"

Edit | Delete

[ Next ]

| Location | Criteria | Action | Settings |
|---|---|---|---|

Type

| Journey |
| Engagement |
| Time |
| Context |
| Visitor Profile |
| Device |

Number of Pages Visited ▼

< ▼   [        ] Pages

[ Save ]   [ Save & Add Another ]

*Reminder: Changes do not take effect until the rule is published*

| Location | Criteria | Action | Settings |

Criteria

( Add Criteria )

Number of Pages Visited < 5

Edit | Delete ( Next )

| Location | Criteria | Action | Settings |

Type

| Engage w/Proactive Chat |
| Engage w/Proactive Knowledge |
| KB Search |
| Add Tag to Visitor Profile |
| Remove Tag from Visitor Profile |
| Stop Evaluating Rules on this Page |

Chat Portal

[ ABC Portal ▼ ]

( Save ) ( Save & Add Another )

*Reminder: Changes do not take effect until the rule is published*

| Location | Criteria | Action | Settings |

Type

- Engage w/Proactive Chat
- Engage w/Proactive Knowledge
- Search KB
- Add Tag to Visitor Profile
- Remove Tag from Visitor Profile
- Stop Evaluating Rules on this Page

Category

Select Category ▼ (Optional)

Page Data

Bush(R) Syndicate 72" L-Desk

Edit Value

[ Save ] [ Save & Add Another ]

*Reminder: Changes do not take effect until the rule is published*

| Location | Criteria | Action | Settings |

Actions

[ Add Action ]

Engage with Proactive Chat

Edit | Delete

Search KB

Edit | Delete

[ Next ]

| Location | Criteria | Action | Settings |

Rule Name

[                    ]

Rule Group

[ None                ▼ ]

Rule Status

[ Enable              ▼ ]

Start Rule On:

Date: [ 01/01/2016 ] (mm/dd/yyyy)

Time: [ 12:00 AM ] (hh:mm am/pm)

End Rule On: (Optional)

Date: [         ] (mm/dd/yyyy)

Time: [         ] (hh:mm am/pm)

[ Save ]

*Reminder: Changes do not take effect until the rule is published*

| Location | Criteria | Action | Settings |

Rule Name

Gold Desk Customers

Rule Group

Product Proactive Chats

Rule Status

Enabled

Start Rule On: 01/01/2016 @ 12:00 AM

End Rule On: No End Date

Edit

[ Close ]

FIG. 11K

ELEMENT MAPPING AND RULE BUILDING SYSTEMS AND METHODS FOR CONTEXTUAL SITE VISITOR ENGAGEMENT

CROSS-REFERENCE TO RELATED APPLICATIONS

This is a continuation of, and claims a benefit of priority from, U.S. patent application Ser. No. 14/964,008, filed Dec. 9, 2015, entitled "ELEMENT MAPPING AND RULE BUILDING SYSTEMS AND METHODS FOR CONTEXTUAL SITE VISITOR ENGAGEMENT," which claims a benefit of priority from U.S. Provisional Application No. 62/089,680, filed Dec. 9, 2014, entitled "AUTOMATIC CONTEXTUAL SITE VISITOR ENGAGEMENT ELEMENT DETECTION AND RULE BUILDING SYSTEMS AND METHODS," both of which are fully incorporated by reference herein for all purposes. This application relates to U.S. patent application Ser. No. 14/819,043, filed Aug. 5, 2015, entitled "SYSTEMS AND METHODS FOR CLIENT-SIDE CONTEXTUAL ENGAGEMENT," which claims a benefit of priority from U.S. Provisional Application No. 62/033,497, filed Aug. 5, 2014, both of which are fully incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to customer engagement. More particularly, embodiments disclosed herein relate to systems, methods, and computer program products for improved building and controlling contextual visitor engagement, including automatic element detection, element mapping, and rule building for various types of engagements, such as sales, marketing, and service engagements.

BACKGROUND OF THE RELATED ART

Engaging web site visitors in a timely manner with the correct customer engagement (e.g., presenting a discount offer on a product to a web site visitor who has shown interest in the product; extending an invitation to a web site visitor to chat with a sales agent, technical support, subject matter expert, etc.; providing additional related information on a product, etc.) has been proven to result in an increase in sales as well as overall customer satisfaction.

Some existing approaches to customer engagement rely on rules to determine when, how, and with whom to engage. For example, specific engagement rules may be built and used by a web server hosting a web site to determine whether to engage a web site visitor based upon information known about the visitor or based upon the visitor's behavior on the web site. This may be done by tracking a number of times a visitor has been to a web site, their flow through the web site, the length of time they've been on a particular web page or the web site, or an action they took while visiting the web site, such as downloading a white paper from the web site. Once a predetermined criterion or threshold defined in an engagement rule (which may be stored in a rules database at the server side) has been met, the web site visitor may be presented (e.g., by the server via a user interface on a client device) with an invitation to chat with a representative of the web site.

With prior approaches to customer engagement, engagement rules may also be defined for a web site to provide some kind of engagement offer(s) to a web site visitor based on specific information known about the web site visitor such as their "status," products in their shopping cart, or cart value. Like the engagement rules, such engagement offers are often predetermined and stored at the server side and selected for presentation to a web site visitor in real time based on non-contextual information about the web site visitor such as the number of visits by the web site visitor, the length of time the web site visitor has spent on a web page, etc. Contextual information from the web page may have no impact on the web site server's decision to engage the web site visitor.

Furthermore, building engagement rules often requires web site administrators to have technical expertise in web site technologies, including authoring languages such as the HyperText Markup Language (HTML) used to create documents on the World Wide Web and style sheet languages such as the Cascading Style Sheets (CSS) used to describe the presentation of a document written in a markup language. For example, to create an engagement rule for a web page, a web site administrator would need to be able to read and understand the source code for the web page, which may be written in HTML or another markup language, and know how to write CSS selectors to implement the engagement rule, with the understanding the limitations of CSS (e.g., there is currently no way to name a CSS rule, so it is not possible to create client-side scripts that refer to CSS rules). As such, building site rules can be an extremely technical, tedious, and error-prone process.

SUMMARY OF THE DISCLOSURE

Embodiments disclosed herein include a novel contextual site visitor engagement building tool (also referred to herein as a context tool) useful for mapping page elements and/or building site rules in context of mapped page elements in an efficient, user-friendly manner. Mappings created using embodiments disclosed herein can be used to build site rules. In some embodiments, a client-side decision engine may evaluate site rules and determine when and how to engage with a user such as a web site visitor.

In some embodiments, a method for mapping elements of a web page may begin when a user directs a browser application running on a computing device to enter into an in-context element mapping mode. The browser application may have an element mapping module already downloaded and/or installed, responsive to the user's earlier instruction. In some embodiments, the element mapping module may be implemented as a bookmarklet running within the browser application. The bookmarklet or code implementing the element mapping module may be obtained, in some embodiments, as part of the context tool, from a server communicatively connected to the computing device.

In some embodiments, in the in-context element mapping mode, the element mapping module may operate to identify page elements on the web page that have been defined and that are eligible for mapping. In some embodiments, this may be done by the element mapping module querying a server at the backend (e.g., an element mapper server), with a universal resource locator (URL) for the web page, to obtain a list of page elements on the web page that have been defined (i.e., have selectors such as CSS selectors either automatically or manually generated).

In response, the server may send a list of defined page elements for the particular web page. The element mapping module may identify those defined page elements on the web page by styling them differently from undefined page elements (i.e., page elements that do not yet have selectors). This way, the user can easily, visually, and quickly identify page elements that can be mapped in the in-context element mapping mode.

In some embodiments, responsive to the user interacting with a page element, the element mapping module may highlight, or otherwise further style, that page element to visually distinguish the page element of interest from other page elements eligible for mapping. When a page element is selected, the element mapping module may generate and provide a popup window or dialog with an input field near the page element of interest or as part of the web page.

In some embodiments, the element mapping module may automatically generate a name for the page element of interest based on page element data containing the page element of interest and display the automatically generated name in the input field. In some embodiments, the automatically generated name can be edited or otherwise modified by the user.

In some embodiments, the element mapping module may, based on a user-provided or automatically generated name for the page element of interest, generate a mapping output associating the user-provided or automatically generated name with the page element of interest. The mapping output may be persisted in association with a selector for the page element of interest.

In some embodiments, a mapping output thus generated by the element mapping module may be used to create or modify a site rule. In some embodiments, a site rule tool may be provided on a web page for creating or editing a site rule using a mapping output in context of a page element of interest displayed on the web page. In this way, an administrator of a web site does not need to be a programmer or a technical person to map and/or utilize elements of a web page.

Site rules thus generated can have many practical applications. As an example, a site rule may be used by a client-side decision engine to generate and present, in real time, a proactive chat invitation when a web site visitor selects a specific value from a list or menu. As another example, a site rule may specify when to initiate a contextual engagement with a web site visitor in real time, for instance, responsive to the web site visitor entering a value over a specific amount in a text field. As yet another example, a site rule may be used by a web site for determining, retrieving, and offering information from a knowledge base that is targeted to a name of a product displayed on a web site visitor's screen.

Those skilled in the art appreciate that embodiments disclosed herein can be implemented in various ways. For example, one embodiment may comprise a system comprising at least one processor and at least one non-transitory computer-readable storage medium that stores computer instructions translatable by the at least one processor to perform a method substantially as described herein. In some implementations, at least a portion of the system may be included as part of an application (e.g., a browser application, a mobile application, a tablet application, etc.) on various types of computing devices including, but are not limited to, desktop computers, laptop computers, tablet computers, mobile computing devices such as personal digital assists, smartphones, etc. Another embodiment may comprise a computer program product having at least one non-transitory computer-readable storage medium that stores computer instructions translatable by at least one processor to perform a method substantially as described herein. Numerous other embodiments are also possible.

Embodiments disclosed herein can provide many advantages. For example, mapping page elements in embodiments disclosed herein is uniquely non-technical and does not require an administrator to identify every conceivable location on a web site where a contextual engagement element may appear. Rather, the administrator can identify a product on one page of the web site and a user-friendly name can be mapped to the product, for instance, on every page of the web site (assuming the underlying technical structure of the page remains consistent). Such a mapping can be made available, via a site rule, to a decision engine. This eliminates the complexity of having the administrator to do the coding to map page elements to CSS selectors and eliminates the need for them to understand the CSS selector code in order to build site rules. Disclosed therefore is a vastly superior solution compared to the existing technically complicated and labor-intensive methods such as those involving writing regular expressions to create engagement rules.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 5A-5B depict an exemplary web page in an in-context element mapping mode according to some embodiments disclosed herein, illustrating an example of user experience;

FIG. 8 depicts an exemplary web page in an in-context element mapping mode with a functional window of an example of an element mapping module according to some embodiments disclosed herein;

FIGS. 9A-9B depict an exemplary dashboard configured with a plurality of functions, including installation of an element mapping module and viewing mapped elements, according to some embodiments disclosed herein;

FIGS. 11A-11K depict an example of a site rule tool accessible in an in-context element mapping mode according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
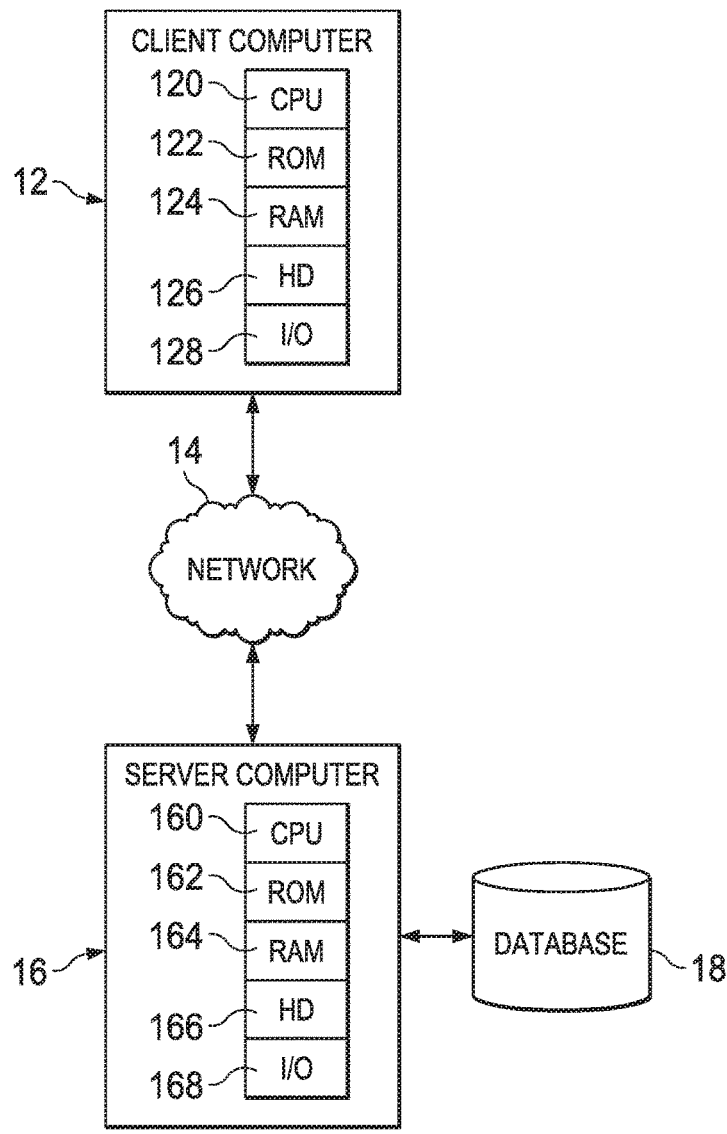
FIG. 1 depicts an example of a hardware architecture where embodiments disclosed herein can be implemented.

Before discussing example embodiments of the invention, a hardware architecture where embodiments disclosed herein can be implemented is described. FIG. 1 illustrates an exemplary architecture and includes client computer 12 bi-directionally coupled to network 14, and server computer 16 bi-directionally coupled to network 14 and database 18. Client computer 12 includes central processing unit ("CPU") 120, read-only memory ("ROM") 122, random access memory ("RAM") 124, hard drive ("HD") or storage memory 126, and input/output device(s) ("I/O") 128. I/O devices 128 can include a keyboard, monitor, printer, electronic pointing device (e.g., a stylus, mouse, trackball, or the like), etc. Server computer 16 can include CPU 160, ROM 162, RAM 164, HD 166, and I/O 168, similar to those described above with reference to client computer 12.

Each of client computer 12 and server computer 16 is an example of a data processing system. ROM 122 and 162, RAM 124 and 164, HD 126 and 166, and database 18 include non-transitory computer-readable media that can be read by CPU 120 and/or 160. ROM 122 and 162, RAM 124 and 164, HD 126 and 166, and/or database 18 may be internal or external to computers 12 and 16.

Figure 2:
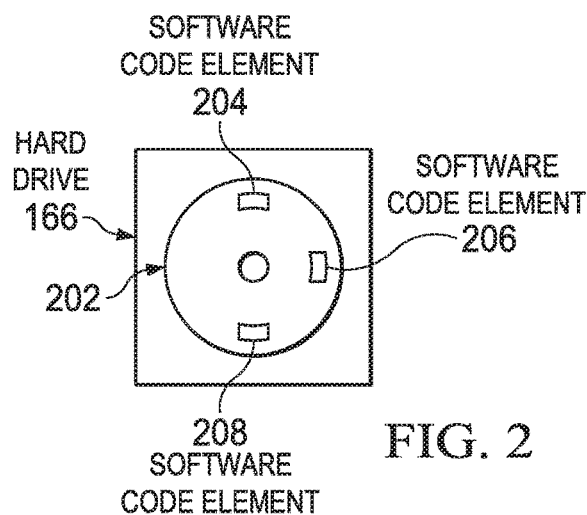
FIG. 2 depicts a diagrammatical representation of software code elements stored on an example non-transitory computer readable medium.

Embodiments described herein may be implemented in suitable software code residing on ROM 122 or 162, RAM 124 or 164, and/or HD 126 or 166. In addition, instructions containing software code elements implementing an embodiment of the invention disclosed herein may be embodied on a data storage device having a non-transitory computer-readable storage medium. As an example, FIG. 2 illustrates software code elements 204, 206, and 208 that are embodied on non-transitory computer-readable storage medium 202 on HD 166. Alternatively, the instructions may be stored as software code elements on a direct access storage device (DASD) array, magnetic tape, floppy diskette, electronic read-only memory, optical storage device, compact disc (CD) ROM or other appropriate non-transitory computer-readable medium or storage device.

As those skilled in the art can appreciate, web sites on the World Wide Web today are usually built using a markup language such as the hypertext markup language (HTML) or the extensible markup language (XML). Documents written in a markup language (e.g., HTML) for a web site are delivered, for instance, by a web server to a web browser running on a client device. To display a web page, the web browser parses a received HTML document containing the source code for the web page into what is known as the document object model (DOM) internal representation and performs on this internal model to render the web page on a screen, running JavaScript whenever is needed, as dictated by the source code for the web page.

A page element refers to an individual component of a web page that has been parsed into the DOM. Take HTML, for example, HTML documents contain tags, but do not contain page elements. Page elements are only generated after the parsing step, from tags contained in the HTML documents. In the HTML syntax, most page elements are written with a start tag and an end tag, with the content in between, if any. In some cases (e.g., HTML parsing using a document type definition (DTD)), it is not possible to infer page elements from document tags alone. In such cases, a standard generalized markup language (SGML) or HTML aware parser with knowledge of the DTD must be used. The DTD specifies which element types are possible (i.e., it defines a set of element types that make up the HTML document) and also specifies what valid combinations may appear in the HTML document.

Along with HTML and JavaScript, most web sites use Cascading Style Sheets (CSS) to describe the presentation, including layout, colors, and fonts, of a document written in a markup language, separate from the content of the document. Multiple HTML documents can share formatting information by specifying formatting instructions for each matching page element in a separate .css file. While this separation of content and presentation can reduce complexity and repetition in rendering the HTML documents, CSS and other style sheet languages alike can be very complex and difficult to use.

In CSS, selectors are used to declare to which part of a markup document a style applies by matching tags and attributes in the markup document. For example, selectors may apply to all elements of a specific type; to elements specified by an attribute (e.g., an identifier unique within the markup document or a class that can annotate multiple elements in the markup document); and to elements related to one another in a document tree. Using CSS selectors requires the knowledge and understanding of CSS syntax, rules, classes, pseudo-classes, declaration, inheritance, etc. Other types of selectors likewise require programming knowledge and/or skills. As such, building a web site or even a rule for the web site usually requires custom coding and testing by highly technical personnel such as a software developer.

As discussed above, an object of this disclosure is to provide a context-aware solution that enables even a non-technical person to easily identify page elements corresponding to portions or areas displayed on a (rendered) web page and be able to provide relevant, "in-context" information (e.g., a product description for an image of a product) for potential contextual engagement with web site visitors of the web page. A context can be considered a container or a data structure storing contextual information relative to a page element, a set of page element, a web page, or a web site). A context may provide a current state or measure in which a web site visitor is in, at a particular location on a particular web page at a particular time, including what they select, what data they enter, etc. This context-aware solution disclosed herein provides a mechanism for a user to associate site rules to page elements currently on a rendered web page so that they can take advantage of the state of the page elements when end users (e.g., web site visitors) interact with those page elements.

In some embodiments, this object can be achieved in a novel context tool that can be invoked within a web page (e.g., one that is part of an operational web site) for a user (e.g., a web site administrator) to map elements of the web page and/or define site rules for contextual engagement with end users such as web site visitors.

The context tool may be implemented in many ways. Some embodiments of a context tool may include an "in-context" mapping functionality embodied on an element mapping module (which is referred to herein as the "Element Mapper") configured for mapping page elements of a rendered web page displayed on a computer with user-defined terms. In some embodiments, such an element mapper can be installed in a web browser as a special JavaScript program referred to as a bookmarklet. A bookmarklet is an unobtrusive script that can be stored in a web browser and that contains JavaScript commands to extend the web browser's functionality. Unlike an applet, however, bookmarklet utilities are stored as bookmarks or hyperlinks and are designed to add one-click functionality to a browser or web page.

Figure 3:
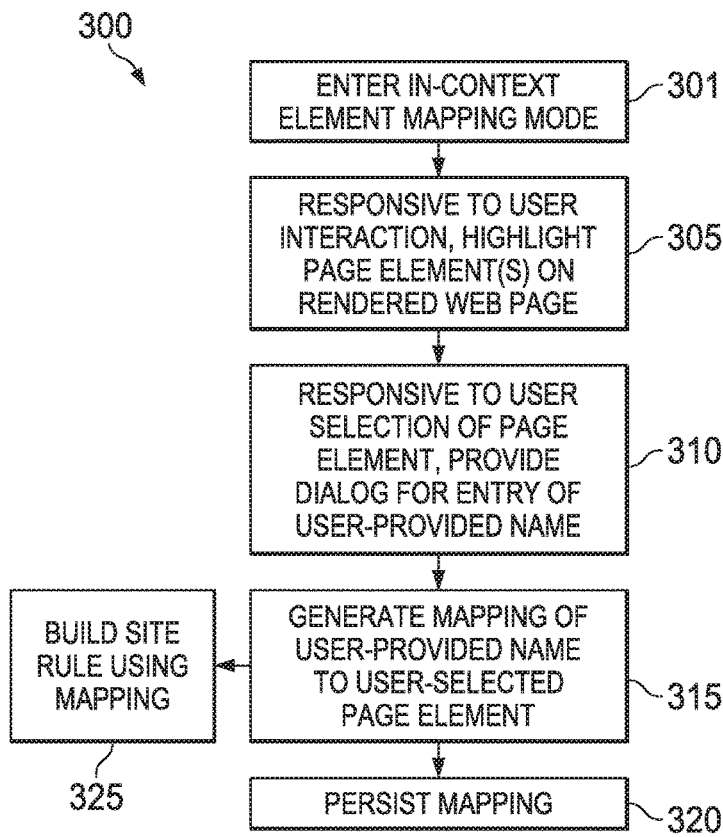
FIG. 3 depicts a flow chart illustrating an example of a method for mapping page elements on a web page according to some embodiments disclosed herein.

Referring to FIG. 3, a special bookmarklet programmed (e.g., at server computer 16 shown in FIG. 1) to provide an "in-context" mapping functionality may be installed in a web browser running on a client device (e.g., client computer 12 shown in FIG. 1). Installation of the special bookmarklet (Element Mapper) can be done by creating a new bookmark in the web browser, and pasting code implementing the Element Mapper into the universal resource locator (URL) destination field. Alternatively, the Element Mapper may be presented as a link (for instance, a reference to a resource at server computer 16) and can be dragged and dropped onto a bookmark bar provided by the browser. When actuated (e.g., a single click on a bookmark associated with the now installed Element Mapper), code implementing components of the Element Mapper (e.g., a JavaScript) is injected into a web page, causing the web browser to display an overlay or a side bar on the web page and enter into page element identification mode or in-context element mapping mode 300, which provides a user-friendly graphical user interface (GUI) from within the web browser to the in-context mapping functionality of the Element Mapper (301).

In in-context element mapping mode 300, elements of the web page are displayed (e.g., a word, an icon, an image, a piece of content, a search field, or a particular location on the web page). This can be done by the Element Mapper querying a server (e.g., via one or more client-side script calls to server computer 16 of FIG. 1) with the URL for the web page. The server may access a database (e.g., database 18 of FIG. 1) and determine whether there are page elements already defined for the web page. The server may return information indicating which, if any, page element has been defined and eligible for mapping. Defined page elements are automatically highlighted when selected or hovered over (305). This allows a user (e.g., an administrator of the web page) to easily and visually identify portions or areas displayed on the web page.

To create a new mapping, the user may click on a "create element" button displayed on the GUI, mouse or hover over a page element of interest, and select the page element (e.g., by right-clicking a mouse key or clicking on a "select" button). Responsive to a page element being selected, a dialog with one or more input fields may be provided (e.g., displayed in a side bar or a popup window near the page element of interest) to the user (310). The user can freely name a mapping to the page element of interest without needing to adhere to and/or understand the requirements of the underlying programming language. This mapping allows the association of a user-friendly (e.g., user-defined or automatically generated) term or name to an otherwise complicated technical address (e.g., via a CSS selector) of the page element on the web page. As described above, while such a selector can be useful in creating site rules, it is very difficult to understand.

The user may provide additional information relevant to the page element (e.g., a product description for an image of a product displayed at a particular location) for potential contextual engagement with end users such as web site visitors viewing the web page (e.g., when a web site visitor's pointing device selects or hovers over the particular location or page element). In some embodiments, multiple page elements may be selected at the same time.

In some embodiments, upon receiving an indication that the information entered by the user is to be saved, a mapping output (also referred to as a "mapping") is automatically generated (315) and persisted in a data store (320). In some embodiments, each mapping associates information provided by a user and a selected page element or set of page elements reflecting an element space. Below is an example mapping output associating user-provided names "Product Title," "Product Category," and "Application Amount," to various page elements:

```
[
    {
        name: "Product Title",
        element: "div.prod_title a"
    },
    {
        name: "Product Category",
        element: "div.breadcrumb li.current"
    },
    {
        name: "Application Amount",
        element: "form#app input.cust_app_amount"
    }
]
```

The stored mappings can be used by other tools, for instance, to build site rules (325). Such site rules may be used, for example, by a decision engine to later reference page elements to pull content, present, and/or combine information for effective, timely, and contextual engagement with an end user such as a web site visitor. In some embodiments, the automatically generated mapping can associate a user-provided term or name for a page element to a CSS selector for the page element. This mapping shields the complexity of the CSS selector and allows a user with little or no programming knowledge to enter any text description for a page element that they deem appropriate (e.g., a non-technical term, nickname, or abbreviation for a product that is familiar to the user using the Element Mapper), which is then automatically assigned to or otherwise associated with the page element. Accordingly, embodiments can advantageously eliminate the need for web site administrators having to understand and/or know how to write page element selectors such as CSS selectors.

Figure 4:
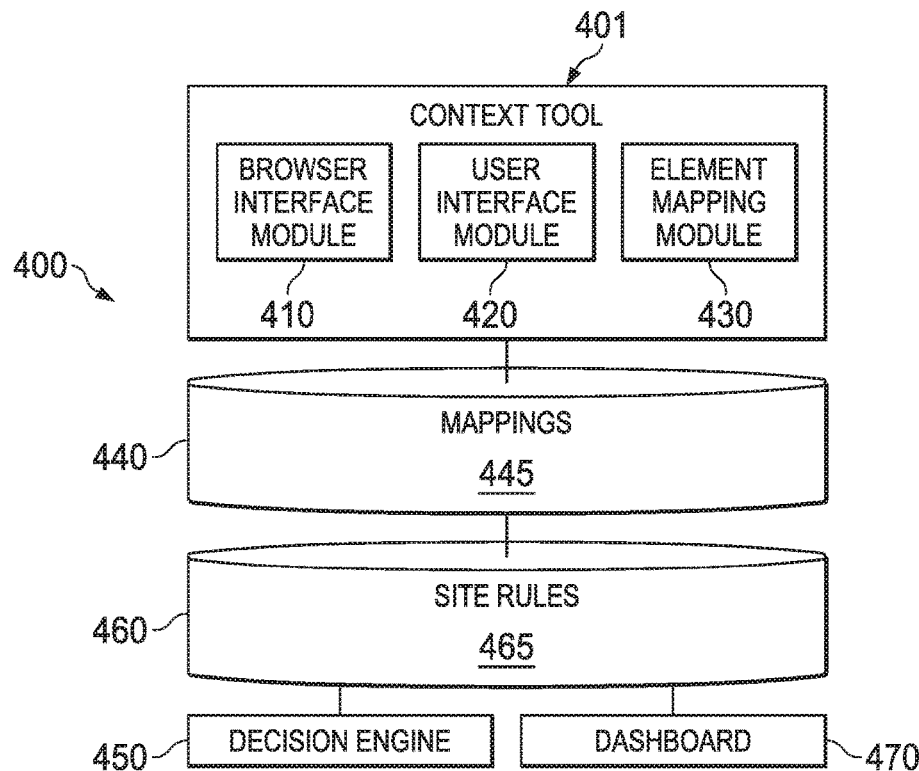
FIG. 4 depicts a diagrammatic representation of a system implementing an example embodiment of a context tool.

FIG. 4 depicts a diagrammatic representation of a system implementing an example embodiment of a context tool. In this example, system 400 may comprise context tool 401, data store 440, decision engine 450, rules database 460, and dashboard 470. Context tool 401 may comprise browser interface module 410, user interface module 420, and element mapping module 430 configured to implement in-context element mapping mode 300 described above with reference to FIG. 3.

Figure 5A:
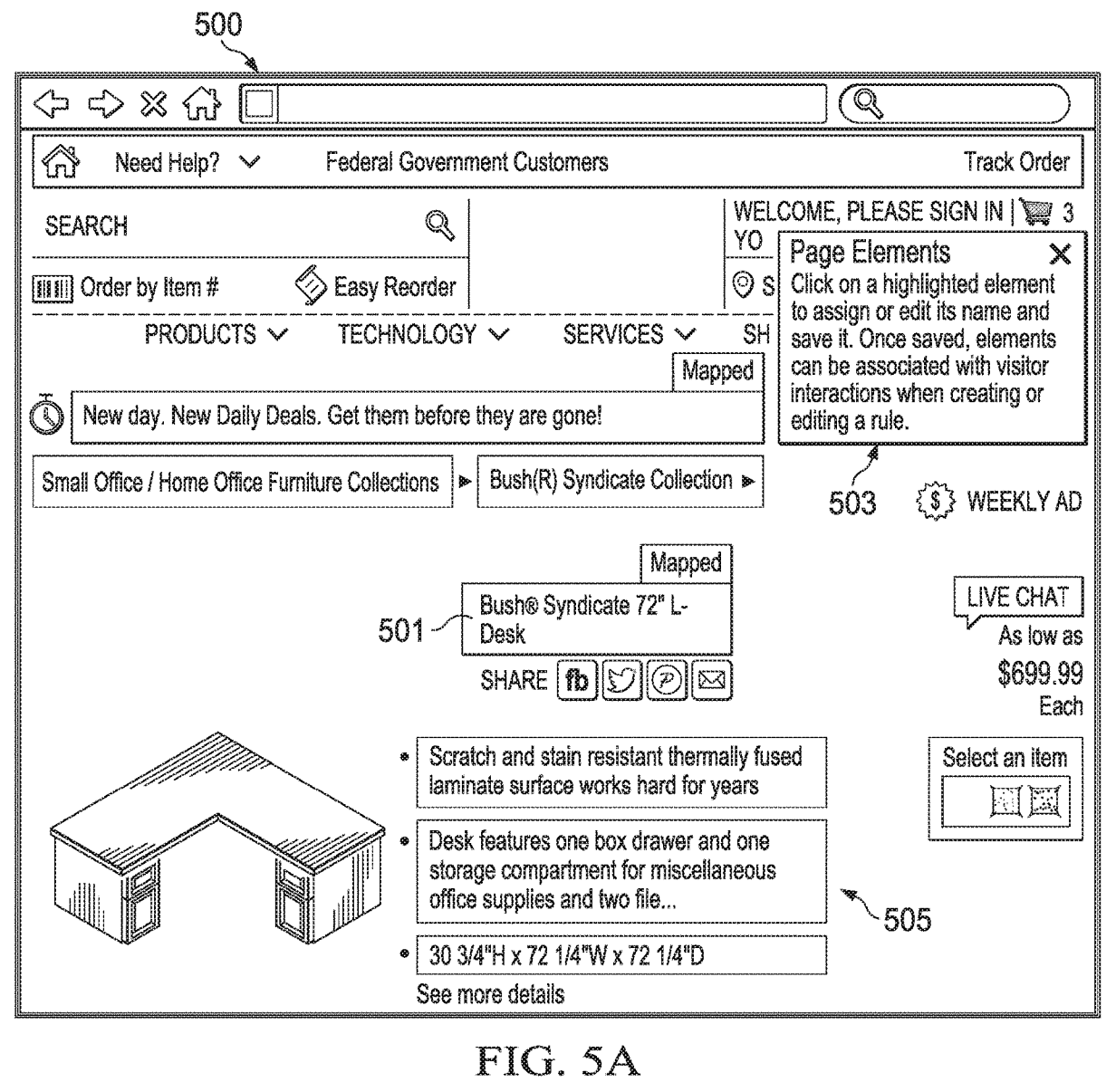

For example, as illustrated in FIG. 5A, page elements of web page 500 useful for providing some context (e.g., location, scope, criteria, etc.) may be highlighted. Highlighting can be done, for instance, using CSS pseudo-classes. Skilled artisans appreciate that a pseudo-class can be used to define a special state of an element. For example, a pseudo-class can be used to style (e.g., highlight in color, font, and/or size) an element when is hovered over. A pseudo-class can also be used to indicate visited and unvisited page elements differently. CSS classes and pseudo-classes are known to those skilled in the art and thus are not further described herein. Note that an element state may extend beyond what current pseudo-classes define.

In some embodiments, page elements that have been mapped (e.g., page element 501 shown on web page 500) may be highlighted or otherwise styled in a manner that visually distinguishes from page elements that have not been mapped (e.g., page element 505). In some embodiments, this can be done by highlighting page elements using visually distinct overlays (e.g., translucent layers in different colors, shapes, sizes, or a combination thereof).

In some embodiments, highlighting can be done, for instance, by browser interface module 410 listening to mouse movement events communicated by a browser application running in in-context element mapping mode 300. Dialog or window 503 may indicate and/or provide information when in an in-context element mapping mode. Browser interface module 410 may identify page element(s) at location(s) under the pointer or cursor (e.g., by sending a set of coordinates of a location on the page to the browser application and receiving information concerning a page element at that location from the browser application) and generate a highlighting layer over the page element(s) thus identified. In some embodiments, clicking on or selecting a highlighted page element may cause the highlighted page element to be captured by user interface module 420 for creating or editing a mapping.

Figure 5B:
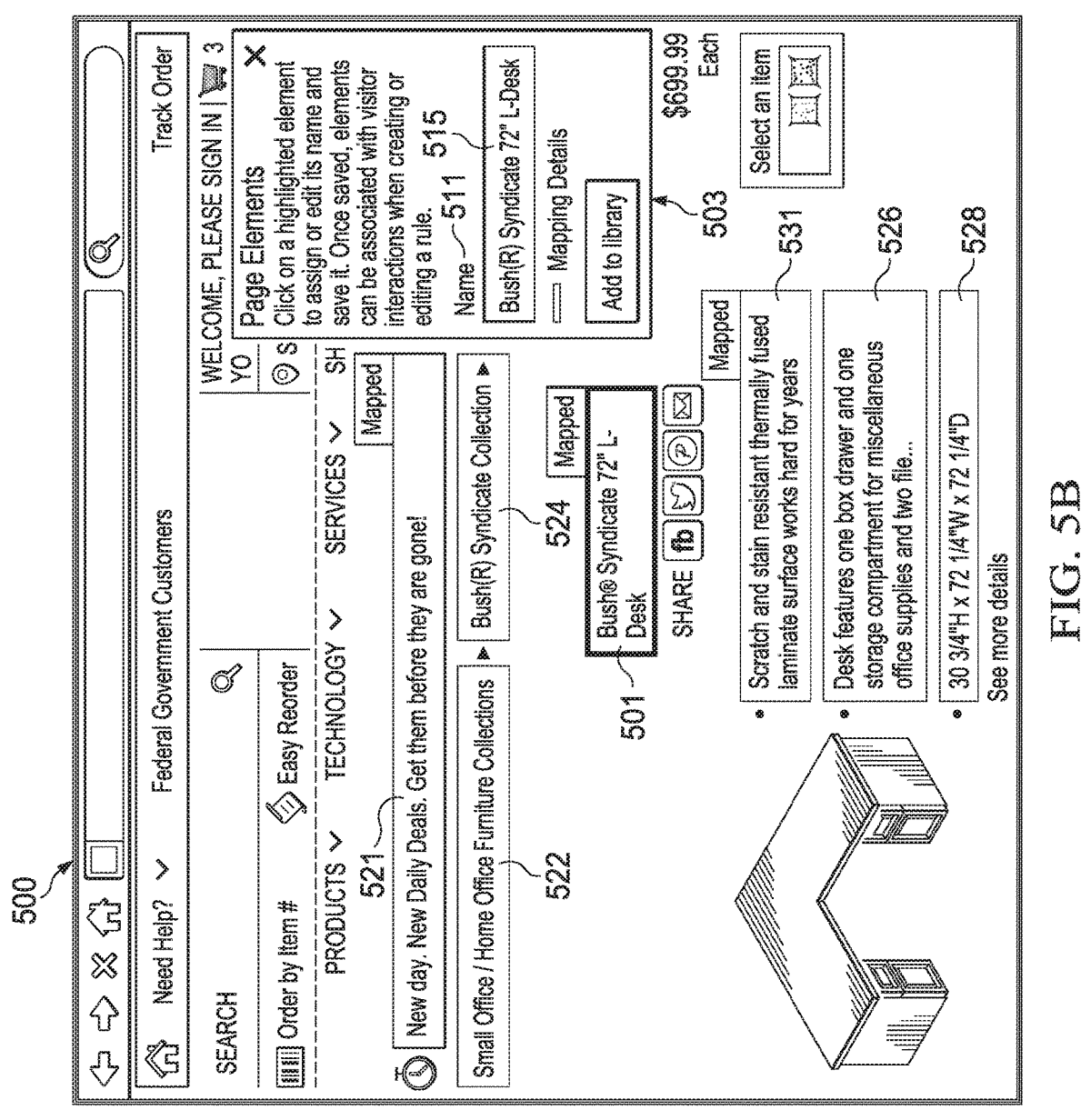

In some embodiments, by default, a set of characters (e.g., 25 characters) of a selected page element can be used by element mapping module 430 as a name or label for a new mapping. FIG. 5B shows an example of input field 511 having an automatically generated name 515 displayed in window 503, responsive to user-selection of page element 501. This automatically generated name can be edited or modified by a user (e.g., an administrator). FIG. 5B also shows, by example, page elements 521 and 531 which have been mapped and page elements 522, 524, 526, and 528 which have not been mapped. These page elements (whether they are mapped or not mapped to user-provided names) have been identified on web page 500 as eligible for mapping. This means that these page elements have selectors (e.g., CSS selectors) that have been automatically or manual generated. A user of context tool 401, however, does not need to understand or know how to generate and/or use CSS selectors. Rather, the user may only need to provide a name or accept a given name for a page element of interest. In some embodiments, element mapping module 430 may include an edit function. The edit function may provide, via user interface module 420 a field for editing (e.g., input field 511 with name 515 of page element 501 automatically captured when page element 501 is selected). The user-provided (or automatically generated/given) name for the page element of interest may be stored as mapping 445 in association with a corresponding selector for the page element. As discussed above, instead of page element selectors, stored mappings 445 (which reference the page element selectors) can be used for building site rules 465 in a significantly more user-friendly manner.

Figure 6A:
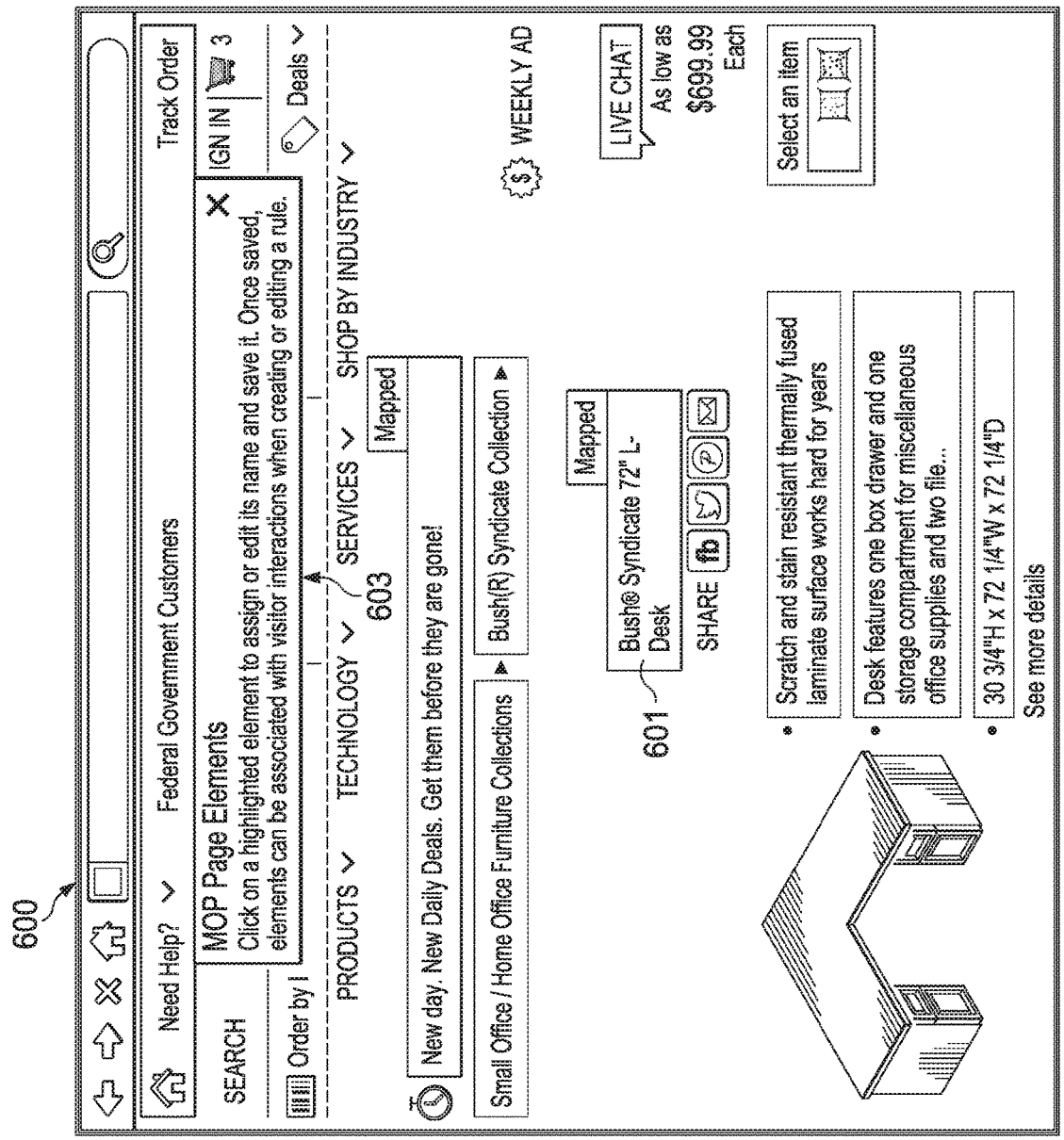
FIGS. 6A-6B depict an exemplary web page in an in-context element mapping mode according to some embodiments disclosed herein, illustrating another example of user experience.
Figure 6B:
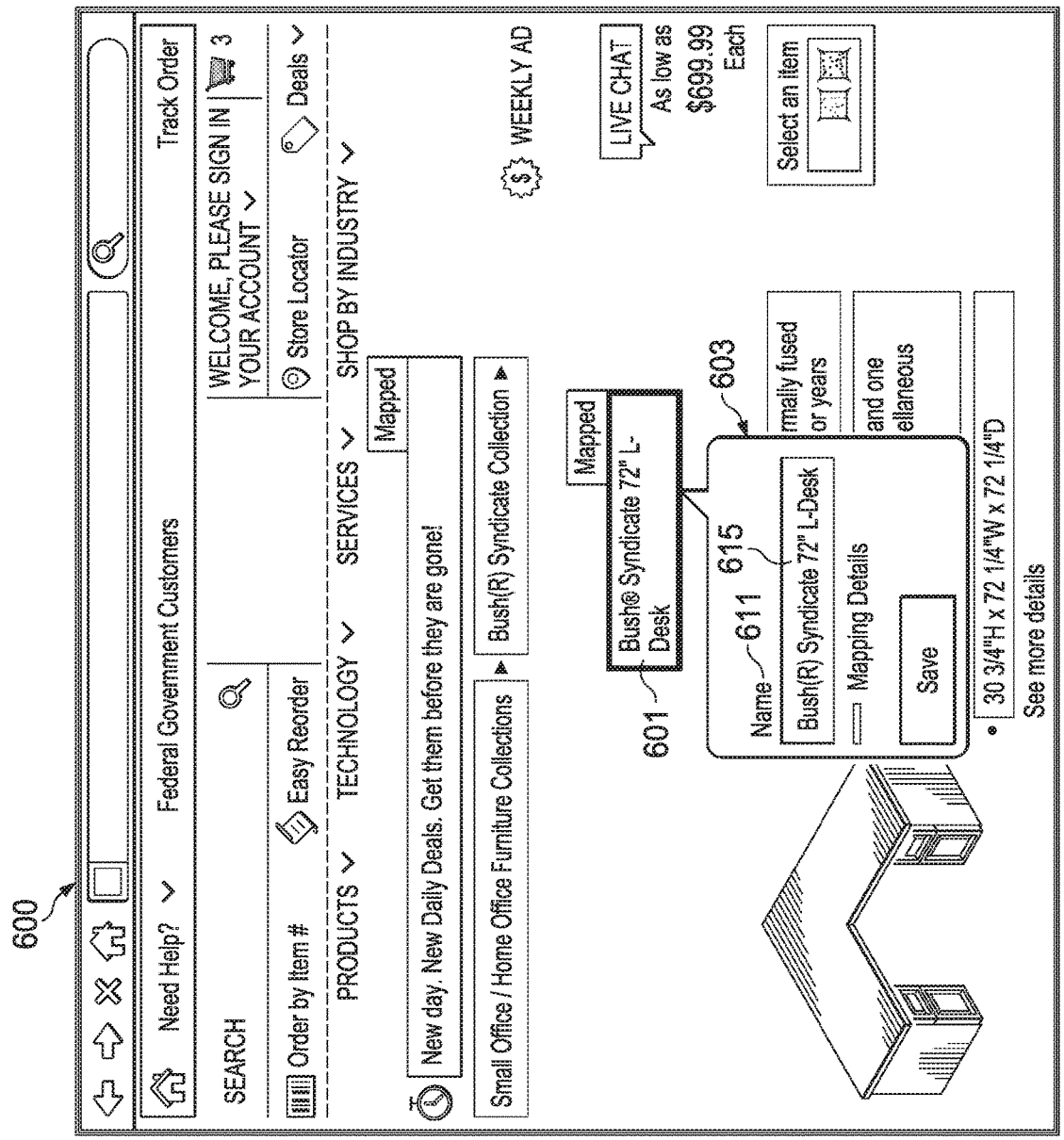

The user experience described above with reference to FIGS. 5A and 5B may differ from implementation to implementation. FIGS. 6A and 6B illustrate a different user experience flow where notification(s) 603 of an in-context element mapping mode may be presented on page 600 and highlighted page elements such as page element 601 can be edited individually via popup window 611 displayed near page element 601 with input field 611 and, optionally, automatically generated, user-editable name 615 for page element 601.

Figure 7A:
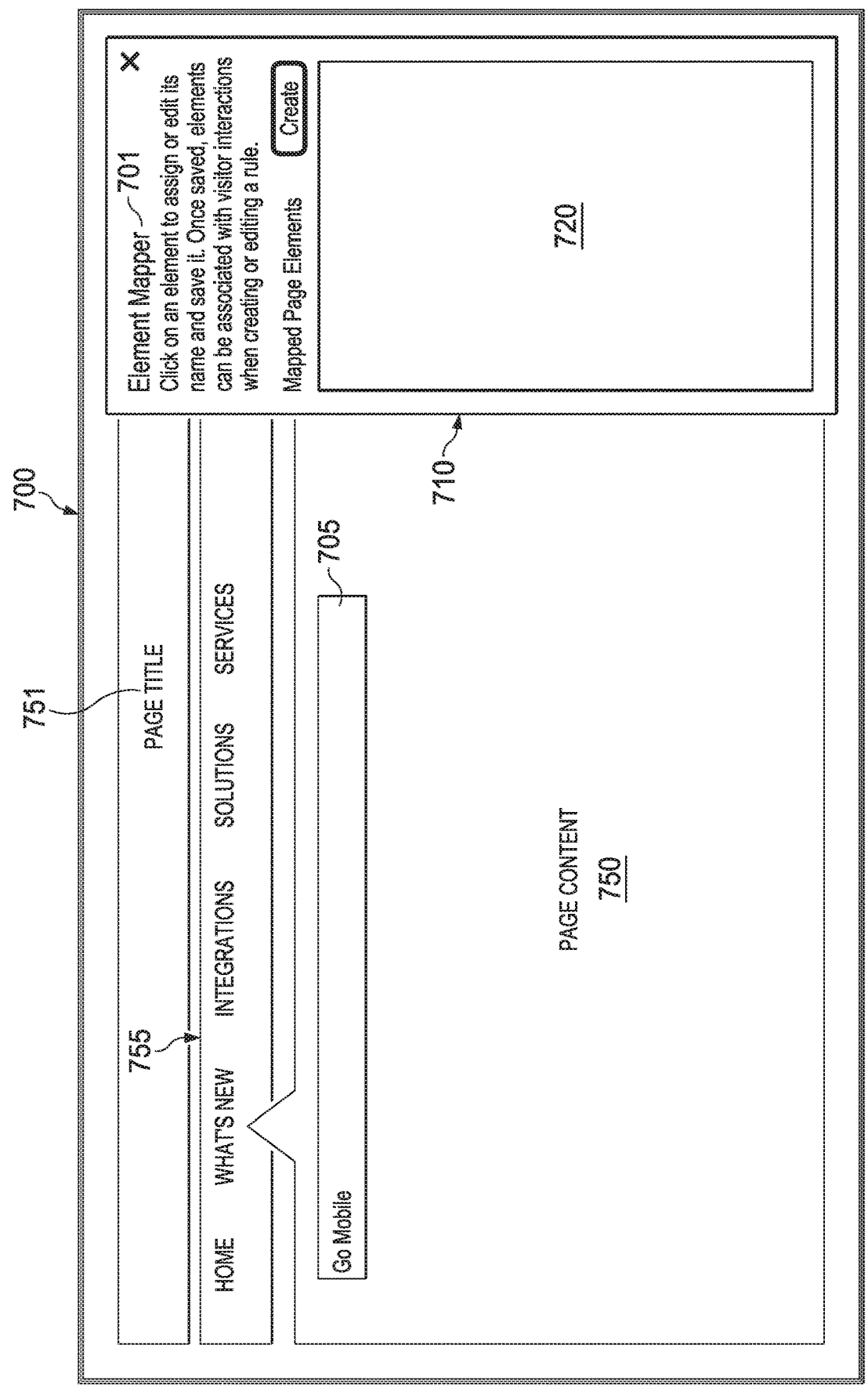
FIGS. 7A-7C depict an exemplary web page in an in-context element mapping mode, illustrating an example of an element mapping module according to some embodiments disclosed herein.
Figure 7B:
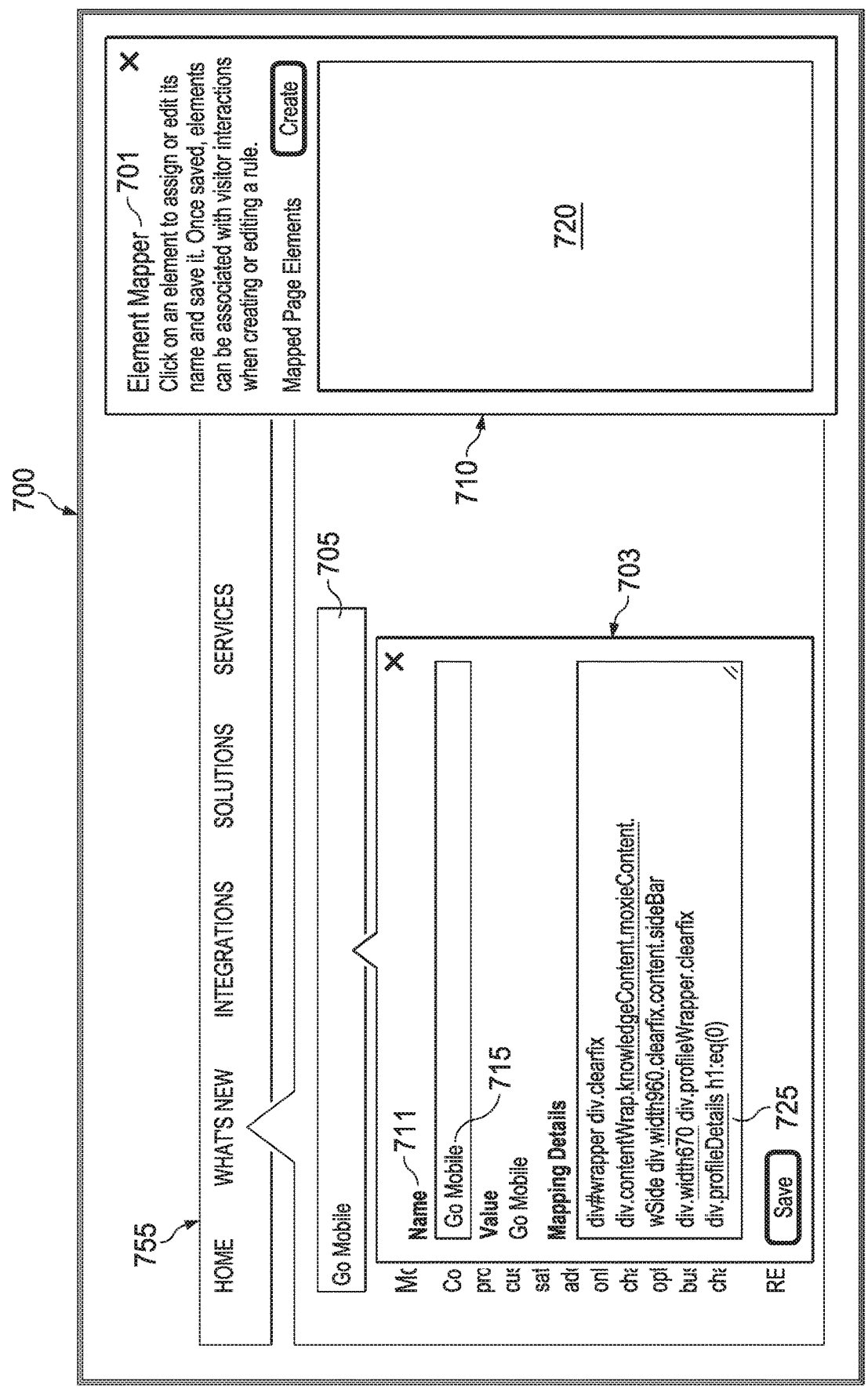
Figure 7C:
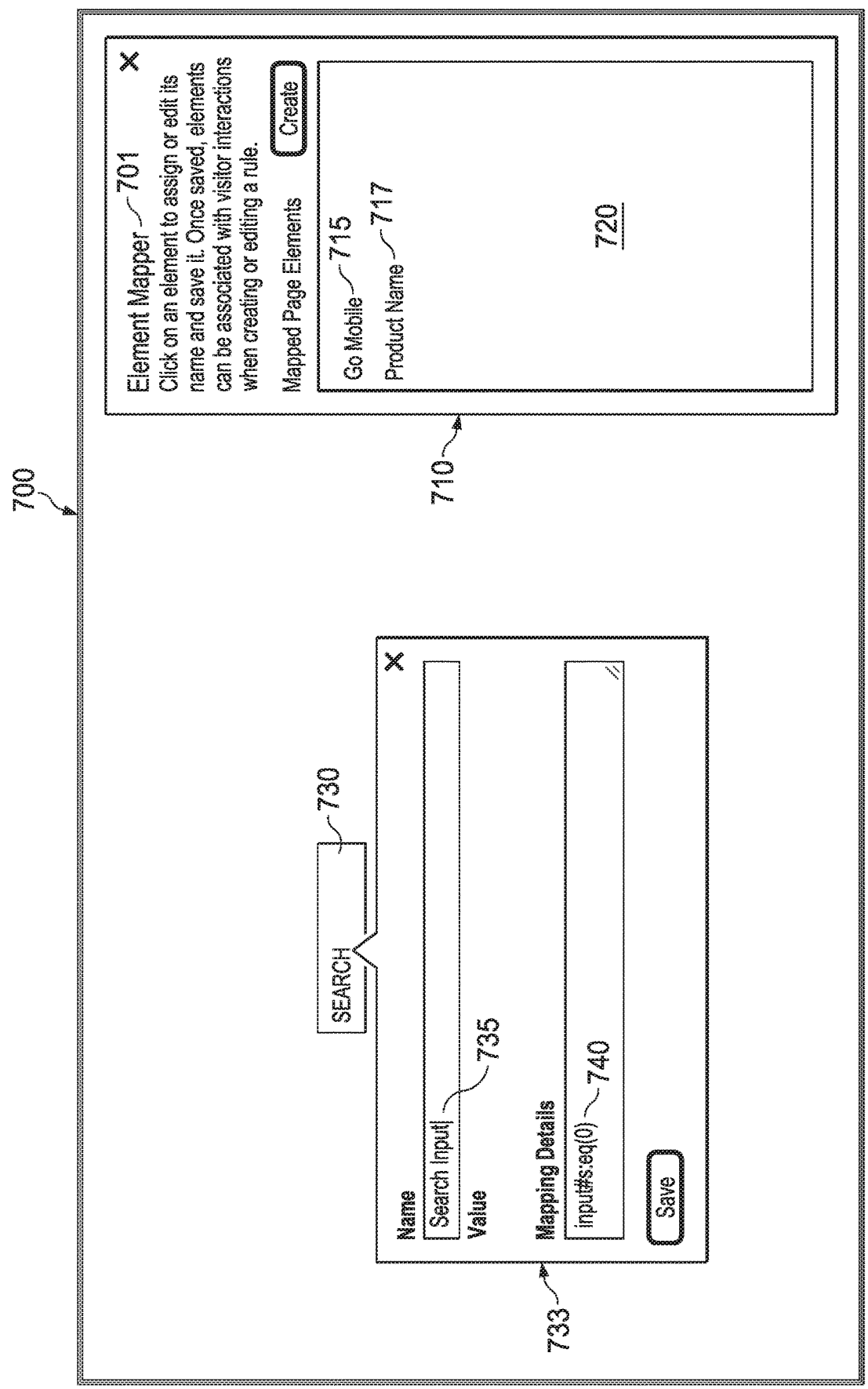

FIGS. 7A-7C depict an exemplary web page in an in-context element mapping mode, illustrating an example of an element mapping module according to some embodiments disclosed herein. In FIG. 7A, as evidenced by the presence of element mapper side bar or window 710, web page 700 has entered an element mapping mode where the in-context element mapping functionality of element mapper 701 is now available to a user (e.g., an administrator or someone who is authorized to work on web page 700). As described above, the user need not have any programming knowledge of style sheet languages or know how to write selectors for page elements.

Initially, mapped element list 720 may be empty as none of the page elements of web page 700 (e.g., page title 751, menu items 755, or page content 750 including content item 705) may have been mapped. To create a mapping for a page element, the user may direct a pointer to the page element. When the pointer hovers over a page element, element mapper 701 may operate to highlight the page element (or, in some embodiments, multiple page elements), as explained above. This is further illustrated in FIG. 7B.

In the example of FIG. 7B, page element 705 is highlighted and, when selected, popup window or dialog 703 may be generated and presented on web page 700. Dialog 703 may include input field 711 where the user can provide name 715 for page element 705. In this case, the user is free to name page element 705 and not constrained by any particular naming convention, schema, or programming language. In some embodiments, element mapper 701 may automatically generate mapping details 725 associated with page element 705 and display same within dialog 703. In some embodiments, mapping details 725 may include information extracted from page element data provided by the browser application. As illustrated in FIG. 7C, once the user saves (e.g., by selecting a "save" button displayed in dialog 703), user-provided term or name 715 for page element 705 is displayed on mapped element list 720 in element mapper window 710.

As described above, in some embodiments, the user may not need to type anything at all in order to create a mapping for a page element. Rather, element mapper 701 may extract mapping details 740 from page element data provided by the browser application, determine name 735 for page element 730 (which, in this example, has been selected by a user), and present name 735 and mapping details 740 in dialog 733, as shown in FIG. 7C. In some embodiments, automatically generated name 735 and/or mapping details 740 may be edited or otherwise modified by the user.

Some embodiments of a context tool may operate to automatically generate a string of text referred to as a selector using data from mapping details 740. In some embodiments, such a selector may conform to the CSS selector syntax and may be used by the context tool for locating and/or selecting page elements based on their identification, classes, types, attributes, values of attributes, and so on, as known to those skilled in the art. Unlike a conventional CSS selector, however, the selector disclosed herein can be automatically generated by the context tool as part of a process in creating a context corresponding to a particular page element.

Figure 8:
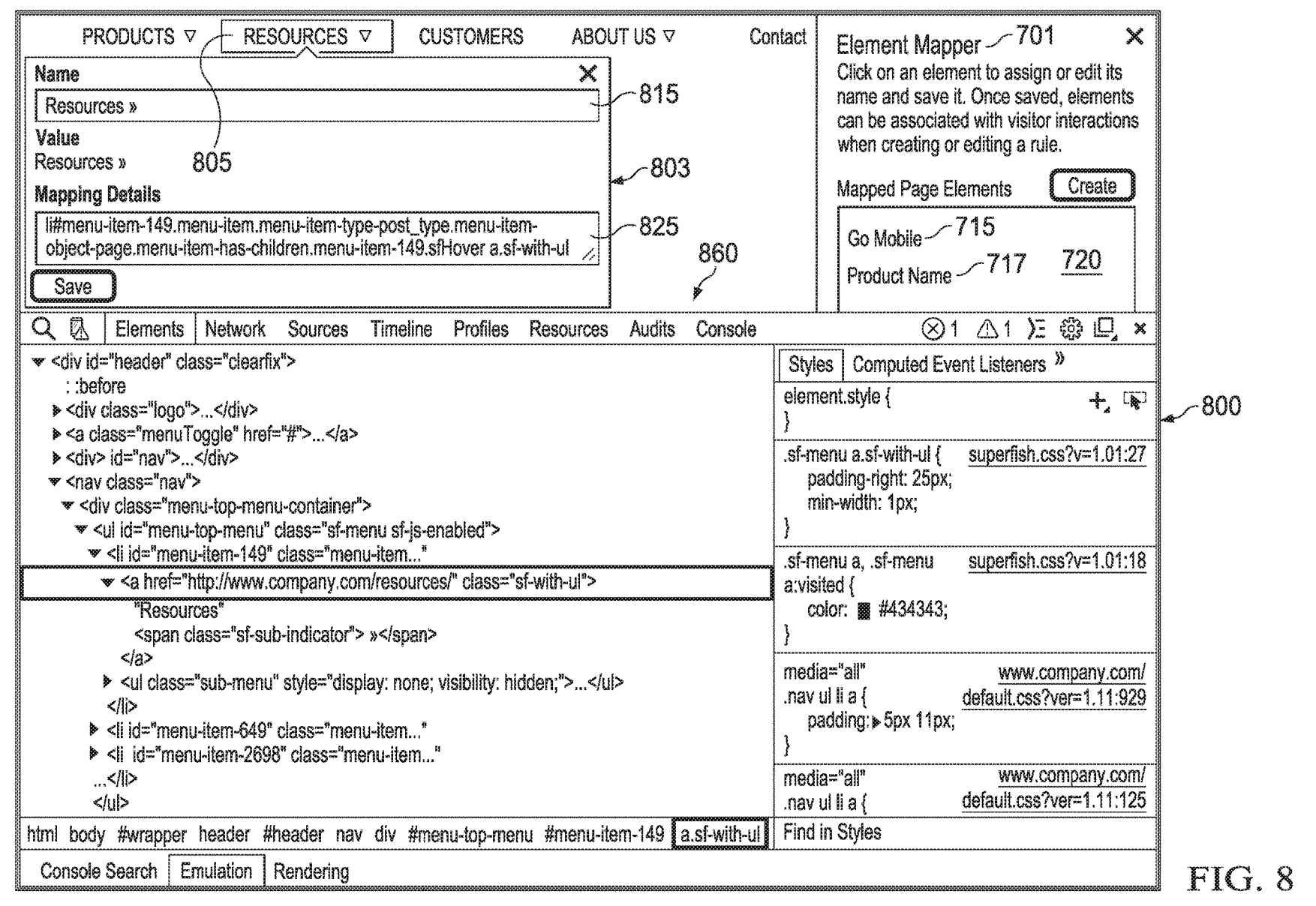

Embodiments of a context tool can include additional functions accessible via a separate functional window overlaying a web page in an in-context element mapping mode. One example is illustrated in FIG. 8. Specifically, FIG. 8 shows one example of functional window 800 having a plurality of sections including section 860. Section 860 shows a portion of the source code for the underlying web page. In this example, a portion of the source code corresponding to highlighted page element 805 is also highlighted. Dialog 803 shows name 815 and mapping details 825 automatically generated based on page element data from the source code. Those skilled in the art will appreciate that the functions illustrated in FIG. 8 are meant to be exemplary and that other functions not shown in FIG. 8 may also be included in embodiments of a context tool disclosed herein.

Figure 9A:
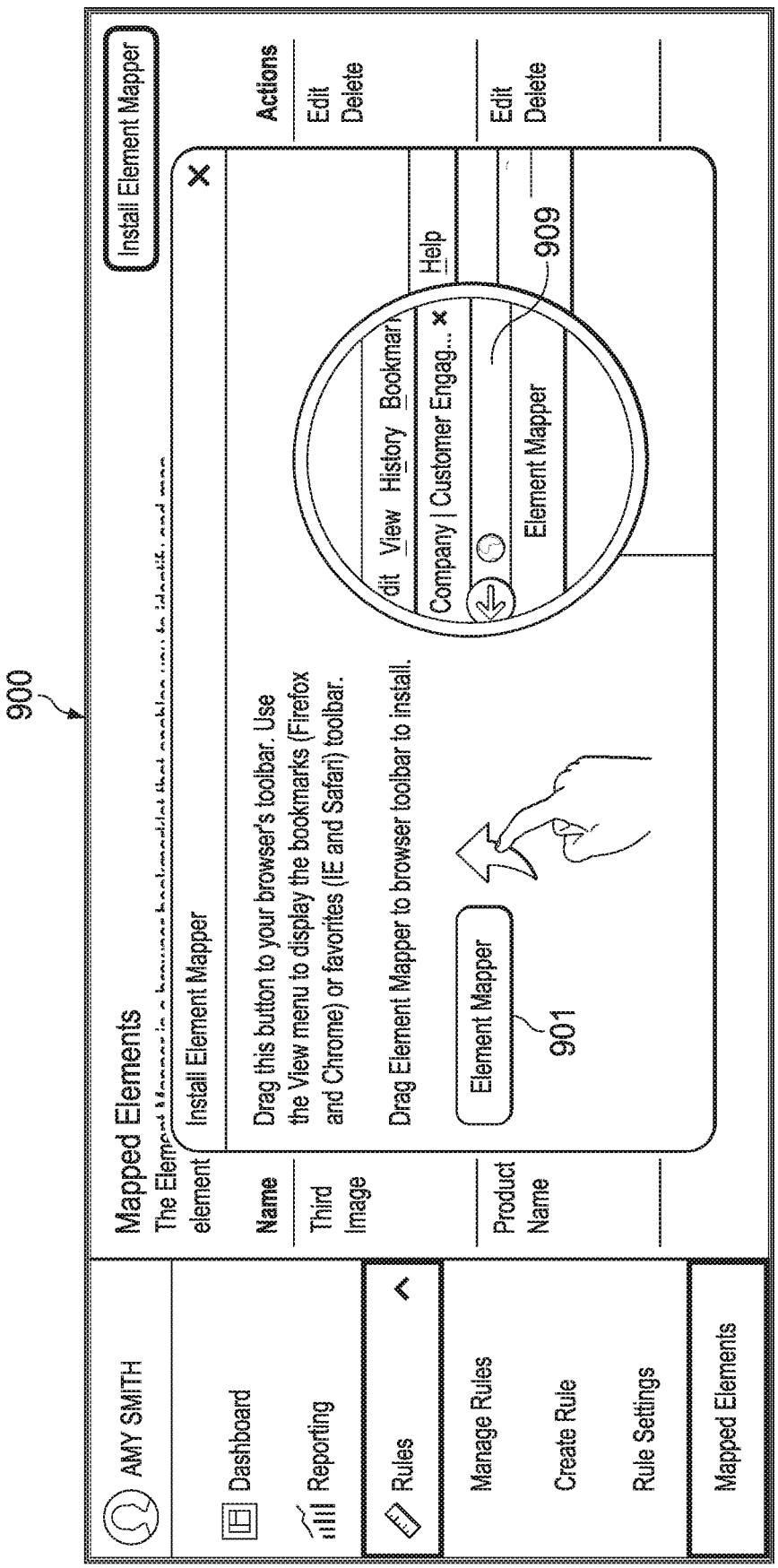

In some embodiments, an administrator such as a web site administrator may be provided with a dashboard (e.g., dashboard 470 shown in FIG. 4) hosted by a server (e.g., server computer 16 shown in FIG. 1). An example of a dashboard is shown in FIG. 9A. In this example, dashboard 900 includes button or link 901 for an embodiment of an element mapper disclosed herein. As explained above, the web site administrator can drag and drop link 901 onto browser tool bar 909 provided by a browser application to install the element mapper.

As shown in FIG. 9B, the web site administrator can navigate to mapped elements tab or section 990 of the dashboard to view mapped page element(s). In this example, mapping 917 may have a user-provided name "Product Name" associated with selector 995. At this point, the web site administrator can create or manage rule(s) using mapping 917 (which identifies a particular page element via selector 995). As described above, mapping 917 may be persisted in non-transitory computer memory (e.g., data store 440) and usable by other modules of the context tool.

Figure 10:
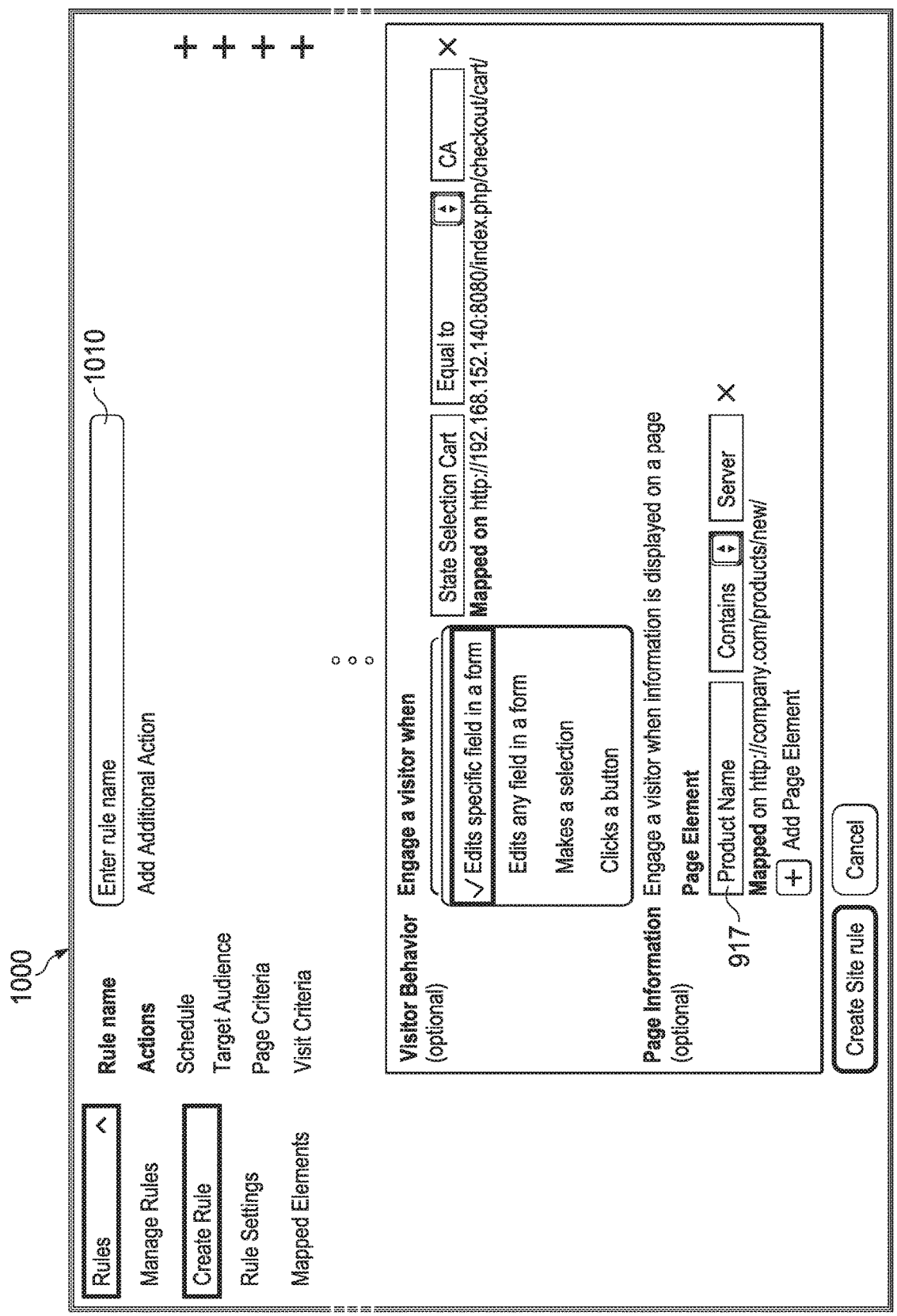
FIG. 10 depicts an example of a site rule tool accessible via an exemplary dashboard according to some embodiments disclosed herein.

As an example, FIG. 10 illustrates how an administrator such as a web site administrator can create site rule 1010 using a mapped page element. Rule creation tool 1000, which may be accessible via a user interface (e.g., dashboard 470), may include a plurality of functions that facilitates the creation of site rule 1010. Unlike conventional approaches, however, the web site administrator can create site rule 1010 without having to write any CCS selector or understand the complexity of CSS or style sheet languages in general.

Rather, the web site administrator can specify one or more mappings (e.g., mapping 917) and define appropriate action, schedule, target audience, page criteria, visit criteria, visitor behavior, etc. In some embodiments, in addition to or alternative to user-generated mappings, page element mappings may be automatically generated without requiring user inputs (e.g., by mapping an automatically generated name for a page element as described above to an automatically generated selector for the page element). This approach can further streamline the site rule creation process by eliminating the need for a web site administrator to manually map page elements. Once created, such site rules can be stored in non-transitory computer memory (e.g., site rules 465 stored in rules database 460 shown in FIG. 4).

As illustrated in FIG. 10, site rules may be defined based on criteria and actions. Criteria are conditions that must be satisfied before an action or actions can take place. In embodiments disclosed herein, these site rules are particularly structured such that they have no if/then statements and serve a specific purpose of customer engagement. This special site rule structure can reduce, if not eliminate, the need for a complex and sophisticated decision engine. Examples of site rules and a suitable decision engine configured to evaluate such site rules for client-side contextual engagement can be found in the above-referenced U.S. patent application Ser. No. 14/819,043, filed Aug. 5, 2015, entitled "SYSTEMS AND METHODS FOR CLIENT-SIDE CONTEXTUAL ENGAGEMENT," which is fully incorporated by reference herein.

Figure 11A:
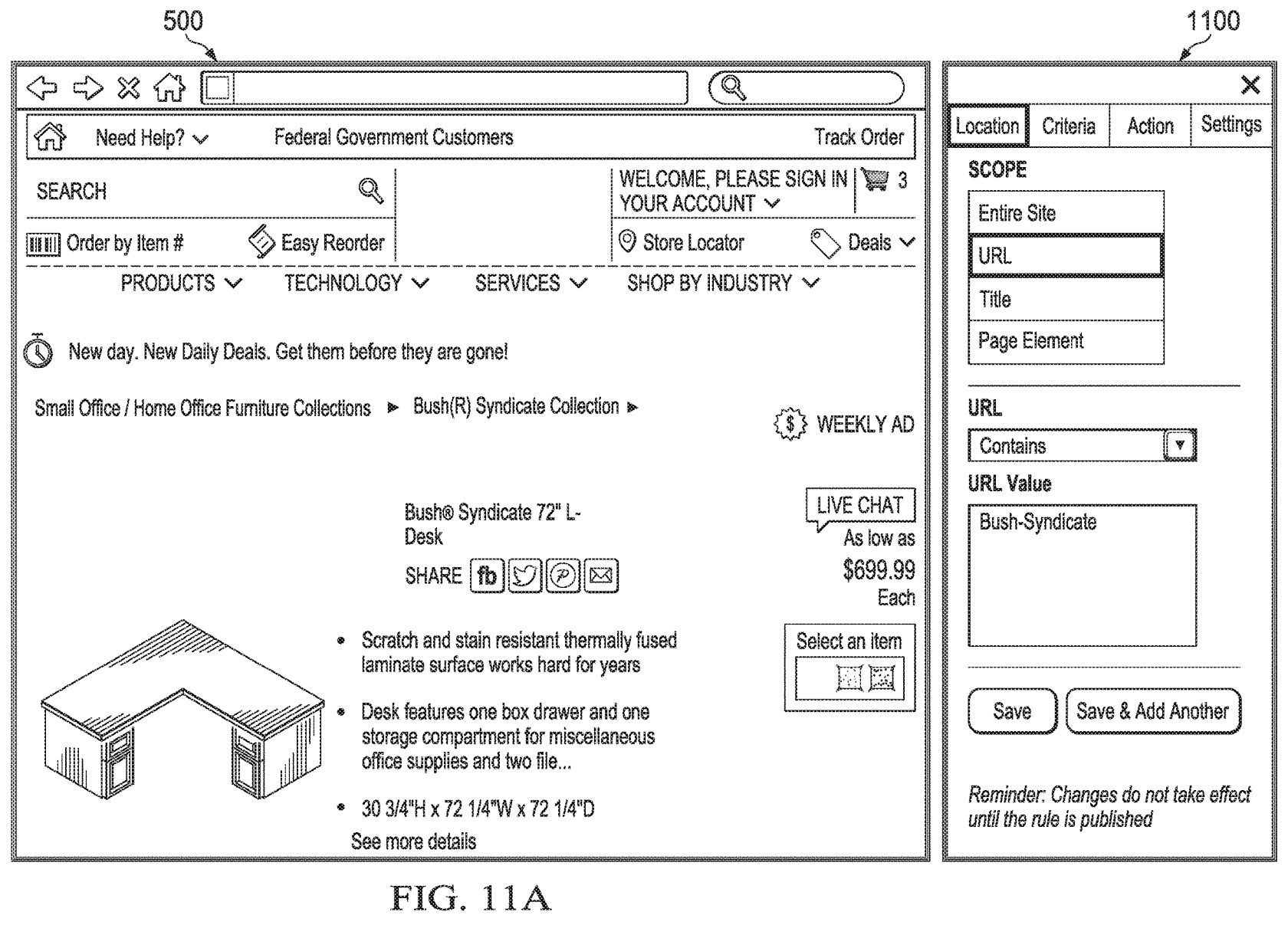
Figure 11B:
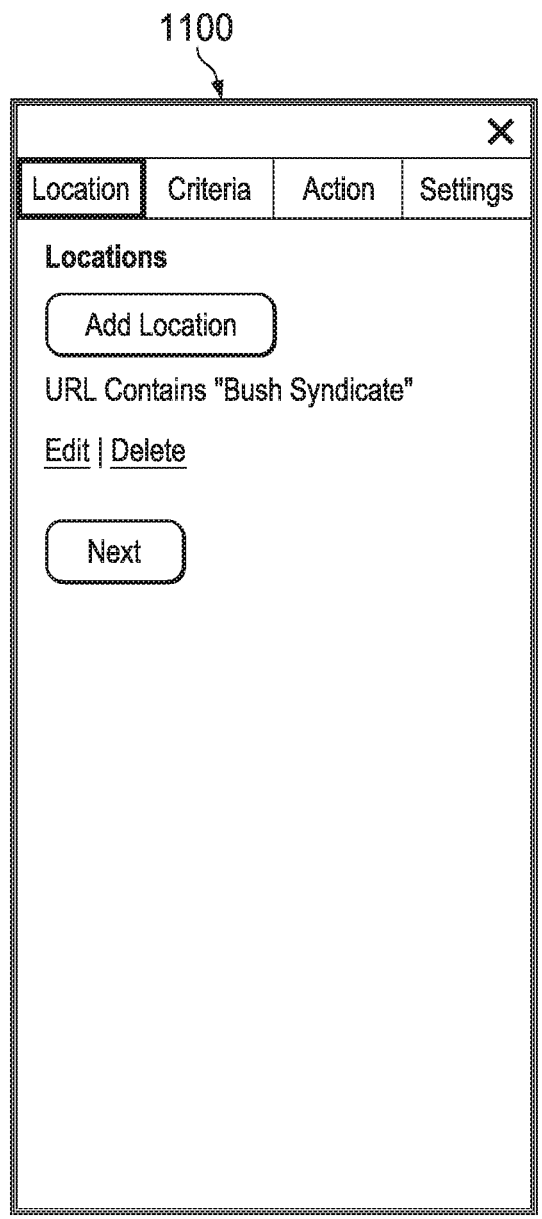
Figure 11C:
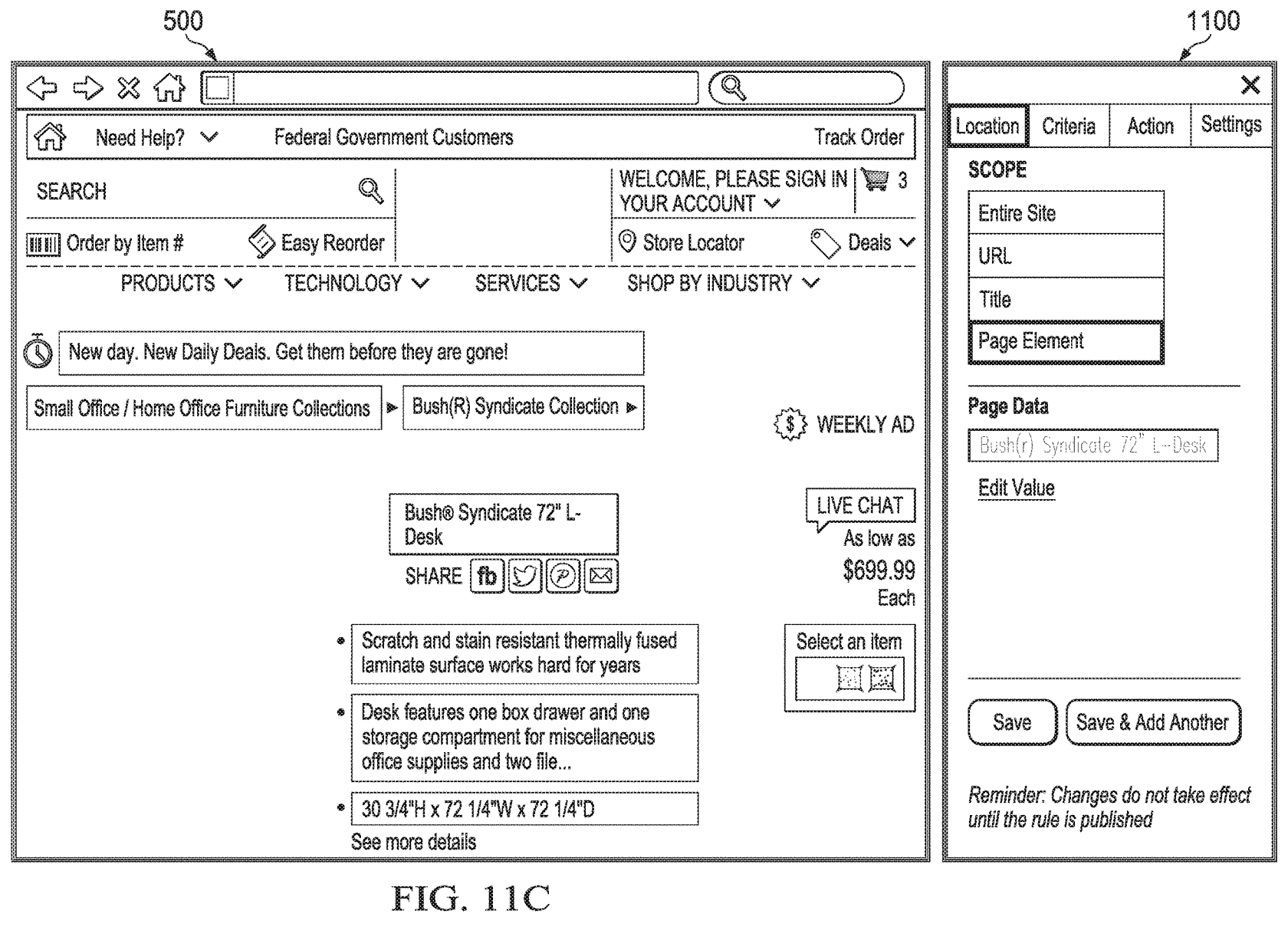

FIGS. 11A-11K illustrate by example site rule tool 1100, which, in some embodiments, can be implemented as part of a context tool (e.g., context tool 401 of FIG. 4) accessible via a user-friendly user interface generated by a user interface module of the context tool (e.g., user interface module 420) to run within a browser application. More specifically, as illustrated in FIG. 11A, in some embodiments, site rule tool 1100 may be made accessible via the Element Mapper described above and may be presented over or alongside web page 500 for which site rule(s) are to be created and/or edited in context of a page element or a set of page elements of interest. For example, as illustrated in FIGS. 11A-11B, a user may define a scope of a site rule (e.g., the entire site, a URL, a title, a page element, etc.). Suppose a page element of page 500 is to be used as a scope for a site rule, page data associated with the page element of interest may be displayed within site rule tool 1100, as illustrated in FIG. 11C. The corresponding page element may be highlighted on page 500, providing a visual indication to the user of the site rule under creation or editing, in context of the page element. The page data can include a user-provided or automatically generated term or name for the page element, as described above. In this example, since an automatically generated term "Bush(r) Syndicate 72" L-Desk" was mapped to the page element of interest, site rule tool 1100 displays the automatically generated term as a way to identify the page element. As illustrated in FIG. 11D, the automatically generated term, rather than a selector, is used by site rule tool 1100 to refer to the page element of interest. Additionally, site rule tool 1100 may include various input functions for specifying site rule criteria, action, and settings, including naming a site rule and, optionally, grouping, enabling, and/or scheduling the site rule, as illustrated in FIGS. 11E-K.

In operation, a decision engine (e.g., decision engine 450 shown in FIG. 4) may, responsive to a site visitor's action relative to a mapped page element on a web site (or inaction—e.g., leaving a high-value item in an online shopping cart of the web site for a predetermined amount of time but does not check out), evaluate a site rule containing a user-provided term or name (or an automatically generated term or name, as described above) mapped to the page element via a selector. The decision engine can determine, based on criteria and actions defined in site rules, whether, when, and/or how to engage a user such as a web site visitor, including what type of engagement should be presented, in context of the page element. Because the visitor's behavior (page visits, actions taken on the page, etc.) and the current page context are available for use by the decision engine, they can also be used as part of the criteria for determining whether to engage, and the type of engagement to present. Visitor behaviors, including their journey throughout the web site, cart actions, checkout, as well as page events, like displaying of errors, can be saved in the local storage for use in subsequent evaluations as well.

The decision engine can run continually, evaluating applicable site rules in real-time. The moment that a site rule evaluation indicates contextual engagement should be performed, a user (e.g., a web site visitor) can be engaged appropriately. This approach can result in an extremely fast initiation of an engagement, which can be crucial in situations where a web site visitor may be about to abandon the web site or, when implemented as part of an application on a mobile or tablet device, a user may be about to close or navigate away from the application (e.g., due to a poor experience, or receiving too many errors on a form).

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by various means. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present). A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural).

Also, as used in the description herein, the meaning of "in" includes "in" and "on" unless the context clearly dictates otherwise. The scope of the present disclosure should be determined by the following claims and their legal equivalents.

What is claimed is:

1. A method for element mapping, comprising:
   receiving, by a computer through an application, an indication that an element of a page of the application is selected by a user;
      responsive to the indication, and responsive to a link to an element mapper being dragged and dropped onto the application, entering the application into an in-context element mapping mode for mapping elements of the page and installing an element mapper to provide the in-context element mapping mode of the application, and creating a mapped element list;
   identifying, by the computer in the in-context element mapping mode of the application, page elements eligible for mapping;
   responsive to the user interacting with a page element of interest, highlighting, on the page by the computer in the in-context element mapping mode of the application, the page element of interest;
   responsive to the user selecting the page element of interest, providing, by the computer in the in-context element mapping mode of the application, a dialog or window with an input field on or over the page;
   generating, by the computer in the in-context element mapping mode of the application, a mapping output based on a user-provided or automatically generated name from the input field of the dialog or window, the automatically generated name generated responsive to the user's selection of the page element of interest, the mapping output comprising and associating the user-provided or automatically generated name with the page element of interest,
   wherein the user-provided or automatically generated name for the page element of interest is added to the maned element list and displayed thereon; and
   persisting, in a data storage device, the mapping output in association with a selector for the page element of interest to thereby shield complexity of the selector from the user,
   wherein the mapping output generated by the computer in the in-context element mapping mode of the application is usable for building or editing a site rule for a decision engine to reference the page element of interest to pull content, present the content, or combine information for effective, timely, and contextual engagement with a web site visitor of the web site.

2. The method according to claim 1, further comprising:
   automatically highlighting defined page elements of the page when selected or hovered.

3. The method according to claim 1, wherein the selector comprises a Cascading Style Sheets selector.

4. The method according to claim 1, further comprising:
   subsequent to receiving the indication that the element of the page is selected by the user, capturing the element of the page for creating or updating the mapping output.

5. The method according to claim 1, wherein the application comprises a browser application.

6. The method according to claim 1, wherein the mapping output is automatically generated by the computer in the in-context element mapping mode of the application without user input.

7. The method according to claim 1, wherein the automatically generated name is generated based on page element data from a source code of the page.

8. A system for element mapping, comprising:
a processor;
a non-transitory computer-readable medium; and
stored instructions translatable by the processor for:
receiving, through an application, an indication that an element of a page of the application is selected by a user;
responsive to the indication, and responsive to a link to an element mapper being dragged and dropped onto the application, entering the application into an in-context element mapping mode for mapping elements of the page and installing an element mapper to provide the in-context element mapping mode of the application, and creating a mapped element list;
identifying, in the in-context element mapping mode of the application, page elements eligible for mapping;
responsive to the user interacting with a page element of interest, highlighting, on the page in the in-context element mapping mode of the application, the page element of interest;
responsive to the user selecting the page element of interest, providing, in the in-context element mapping mode of the application, a dialog or window with an input field on or over the page;
generating, in the in-context element mapping mode of the application, a mapping output based on a user-provided or automatically generated name from the input field of the dialog or window, the automatically generated name generated responsive to the user's selection of the page element of interest, the mapping output comprising and associating the user-provided or automatically generated name with the page element of interest;
wherein the user-provided or automatically generated name for the page element of interest is added to the mapped element list and displayed thereon; and
persisting, in a data storage device, the mapping output in association with a selector for the page element of interest to thereby shield complexity of the selector from the user, wherein the mapping output generated in the in-context element mapping mode of the application is usable for building or editing a site rule for a decision engine to reference the page element of interest to pull content, present the content, or combine information for effective, timely, and contextual engagement with a web site visitor of the web site.

9. The system of claim 8, wherein the stored instructions are further translatable by the processor for:
automatically highlighting defined page elements of the page when selected or hovered over.

10. The system of claim 8, wherein the selector comprises a Cascading Style Sheets selector.

11. The system of claim 8, wherein the stored instructions are further translatable by the processor for:
subsequent to receiving the indication that the element of the page is selected by the user, capturing the element of the page for creating or updating the mapping output.

12. The system of claim 8, wherein the application comprises a browser application.

13. The system of claim 8, wherein the mapping output is automatically generated by the computer in the in-context element mapping mode of the application without user input.

14. The system of claim 8, wherein the automatically generated name is generated based on page element data from a source code of the page.

15. A computer program product for element mapping, the computer program product having a non-transitory computer-readable medium storing instructions translatable by a processor for:
receiving, through an application, an indication that an element of a page of the application is selected by a user;
responsive to the indication, and responsive to a link to an element mapper being dragged and dropped onto the application, entering the application into an in-context element mapping mode for mapping elements of the page an installing an element mapper to provide the in-context element mapping mode of the application, and creating a mapped element list;
identifying, in the in-context element mapping mode of the application, page elements eligible for mapping;
responsive to the user interacting with a page element of interest, highlighting, on the page in the in-context element mapping mode of the application, the page element of interest;
responsive to the user selecting the page element of interest, providing, in the in-context element mapping mode of the application, a dialog or window with an input field on or over the page;
generating, in the in-context element mapping mode of the application, a mapping output based on a user-provided or automatically generated name from the input field of the dialog or window, the automatically generated name generated responsive to the user's selection of the page element of interest, the mapping output comprising and associating the user-provided or automatically generated name with the page element of interest;
wherein the user-provided or automatically generated name for the page element of interest is added to the mapped element list and displayed thereon; and
persisting, in a data storage device, the mapping output in association with a selector for the page element of interest to thereby shield complexity of the selector from the user,
wherein the mapping output generated in the in-context element mapping mode of the application is usable for building or editing a site rule for a decision engine to reference the page element of interest to pull content, present the content, or combine information for effective, timely, and contextual engagement with a web site visitor of the web site.

16. The computer program product of claim 15, wherein the instructions are further translatable by the processor for:
automatically highlighting defined page elements of the page when selected or hovered over.

17. The computer program product of claim 15, wherein the selector comprises a Cascading Style Sheets selector.

18. The computer program product of claim 15, wherein the instructions are further translatable by the processor for:
subsequent to receiving the indication that the element of the page is selected by the user, capturing the element of the page for creating or updating the mapping output.

19. The computer program product of claim 15, wherein the mapping output is automatically generated by the computer in the in-context element mapping mode of the application without user input.

20. The computer program product of claim 15, wherein the automatically generated name is generated based on page element data from a source code of the page.

\* \* \* \* \*